(12) United States Patent
Karaca et al.

(10) Patent No.: US 9,283,622 B2
(45) Date of Patent: Mar. 15, 2016

(54) METHOD FOR MANUFACTURING ALLOY POWDERS BASED ON TITANIUM, ZIRCONIUM AND HAFNIUM, ALLOYED WITH THE ELEMENTS NI, CU, TA, W, RE, OS AND IR

(75) Inventors: Ahmet Karaca, Goslar (DE); Bernd Sermond, Aβlar (DE); Gerhard Wilfing, Cölbe (DE)

(73) Assignee: Chemetall GmbH, Frankfurt am Main (DE)

( * ) Notice: Subject to any disclaimer, the term of this patent is extended or adjusted under 35 U.S.C. 154(b) by 473 days.

(21) Appl. No.: 12/867,501

(22) PCT Filed: Feb. 27, 2009

(86) PCT No.: PCT/EP2009/052336
§ 371 (c)(1),
(2), (4) Date: Aug. 13, 2010

(87) PCT Pub. No.: WO2009/106600
PCT Pub. Date: Sep. 3, 2009

(65) Prior Publication Data
US 2010/0313709 A1    Dec. 16, 2010

(30) Foreign Application Priority Data

Feb. 28, 2008  (DE) .......................... 10 2008 000 433

(51) Int. Cl.

| | |
|---|---|
| B22F 9/20 | (2006.01) |
| C01B 6/24 | (2006.01) |
| C22B 5/04 | (2006.01) |
| C22B 34/12 | (2006.01) |
| C22B 34/14 | (2006.01) |
| C22C 1/04 | (2006.01) |
| C22C 9/00 | (2006.01) |
| C22C 14/00 | (2006.01) |
| C22C 16/00 | (2006.01) |
| C22C 19/03 | (2006.01) |
| C22C 27/04 | (2006.01) |

(52) U.S. Cl.
CPC ... *B22F 9/20* (2013.01); *C01B 6/24* (2013.01); *C22B 5/04* (2013.01); *C22B 34/1268* (2013.01); *C22B 34/1286* (2013.01); *C22B 34/14* (2013.01); *C22C 1/0458* (2013.01); *C22C 9/00* (2013.01); *C22C 14/00* (2013.01); *C22C 16/00* (2013.01); *C22C 19/03* (2013.01); *C22C 27/04* (2013.01); *B22F 2998/00* (2013.01); *B22F 2998/10* (2013.01); *B22F 2999/00* (2013.01)

(58) Field of Classification Search
None
See application file for complete search history.

(56) References Cited

U.S. PATENT DOCUMENTS

| | | | | |
|---|---|---|---|---|
| 6,559,582 | B2 * | 5/2003 | Miyamoto et al. | ........ 313/346 R |
| 2004/0022722 | A1 | 2/2004 | Martin | |
| 2006/0174727 | A1 | 8/2006 | Bick et al. | |
| 2006/0191372 | A1 * | 8/2006 | Haidar | .......... 75/10.21 |
| 2010/0272999 | A1 * | 10/2010 | Baudis | ........... 428/402 |

FOREIGN PATENT DOCUMENTS

| | | | |
|---|---|---|---|
| CN | 1104136 A * | 6/1995 | |
| WO | WO 2005/007906 A1 | 1/2005 | |
| WO | WO 2006/089222 A2 | 8/2006 | |

OTHER PUBLICATIONS

PCT International Search Report issued in corresponding application PCT/EP2009/052336.

* cited by examiner

*Primary Examiner* — George Wyszomierski
(74) *Attorney, Agent, or Firm* — Jeremy J. Kliebert

(57) ABSTRACT

A method for manufacturing alloy powders based on titanium, zirconium and hafnium alloyed with the elements Ni, Cu, Ta, W, Re, Os, and Ir is described in which an oxide of Ti and Zr and Hf is mixed with a metal powder of the elements named and with a reducing agent, and wherein this mixture is heated in a furnace, optionally under a argonate atmosphere or, optionally under hydrogen atmosphere until the reducing reaction begins, the reaction product is leached and then washed and dried, wherein the oxide used has an average grain size of 0.5 to 20 μm, a specific surface area according to BET of 0.5 20 m$^2$/g and a minimum content of 94 wet. –%. An easy to produce powder, in particular in relation to the ignition point and burning time, is produced.

27 Claims, No Drawings

METHOD FOR MANUFACTURING ALLOY POWDERS BASED ON TITANIUM, ZIRCONIUM AND HAFNIUM, ALLOYED WITH THE ELEMENTS NI, CU, TA, W, RE, OS AND IR

RELATED APPLICATIONS

This application is a §371 application from PCT/EP2009/052336 filed Feb. 27, 2009, which claims priority from German Patent Application No. 10 2008 000 433.2 filed Feb. 28, 2008, each of which is herein incorporated by reference in its entirety.

FIELD OF THE INVENTION

The invention relates to a process for producing alloy powders based on titanium, zirconium and hafnium, alloyed with the elements Ni, Cu, Ta, W, Re, Os and Ir.

BACKGROUND OF THE INVENTION

Alloy powders based on titanium, zirconium and hafnium are used in the pyro industry, in the production of electrical igniters, for example in airbags and ignition delay elements, as getter materials in vacuum tubes, in lamps, in vacuum equipment and in gas purifiers. Given the very high standards of reliability required of the aforementioned products, for example airbag igniters, it is desirable to produce the alloy powders reproducibly with consistent properties from one batch to the next, particularly with regard to burning time, ignition temperature, average particle size, particle size distribution and oxidation number. It is also desirable to be able to set the cited properties to specific values from the outset.

The alloy powders can be produced by means of a combined reduction and alloying process. To this end the oxide of titanium ($TiO_2$), zirconium ($ZrO_2$) or hafnium ($ZrO_2$) is reduced together with the powdered alloying elements and a reducing agent such as calcium and/or calcium hydride and/or magnesium and/or barium. The reduction is performed in a closed vessel that is capable of being inerted. The reducing agent(s) is/are generally added in excess. Following the reduction the reducing agent oxides formed are removed by leaching with acid and subsequent washing with water. The oxygen content of the metal alloy powders obtained is between 1 and 5% with this process.

Alternatively the alloy powders based on Ti, Zr, Hf can be obtained from the corresponding metal by hydrogenation and dehydrogenation (HDH process). The corresponding metal is hydrogenated and in this brittle form can then be mechanically comminuted to a powder of the desired fineness. Ultrapure hydrogen must be used for hydrogenation to prevent damage due to absorption of oxygen and nitrogen. The comminution of the hydrogenated metal to the desired particle size must likewise take place in a pure protective gas atmosphere, for example helium or argon. For the subsequent removal of hydrogen and formation of the alloy, the titanium, zirconium or hafnium metal hydride powder and the metal hydride powder or metal powder to be alloyed is broken down under vacuum at elevated temperature and alloyed at the same time.

One of the disadvantages of alloy powders produced in this way is that they do not have a reproducible burning time, specific surface area, particle size distribution or ignition temperature.

OBJECTS OF THE INVENTION

The object of the invention is to overcome the disadvantages of the prior art.

DETAILED DESCRIPTION

A zirconium alloy powder is provided which has a burning time of 4 s/50 cm (seconds per 50 cm) to 2000 s/50 cm and an ignition temperature of 160° C. to 400° C. or more in individual cases. The burning time, expressed in s/50 cm, is determined as follows: The substance to be tested is first sieved through two screens with mesh sizes of 250 μm and 45 μm to remove any disruptive agglomerates. The sample can optionally be moved carefully using a brush. The burning time is determined using the fines which passed through the 45 μm screen. 15 g of the sample are poured loosely into a metal channel described below, smoothed out with a piece of cardboard and the excess wiped away. The metal channel has two markers a distance of 500 mm apart. A roughly pea-sized amount of substance is added in front of the initial marker and ignited with a burner. A timer is used to determine the time taken for the burning process to cover the distance between the initial marker and the end marker. The results of the burning time analysis are stated in the dimension [s/50 cm] (seconds per 50 cm). The burning channel, measuring 3 mm×2 mm, is incorporated into a steel sheet measuring 40 mm×9.4 mm×600 mm.

The ignition temperature is determined as follows: 10 g of the substance to be tested are introduced into a preheated "ignition block" and the temperature at which self-ignition occurs is measured. The ignition block, consisting of an iron cube with sides of 70 mm having drill holes to accommodate the material and a thermocouple (20 mm and 8 mm diameter respectively, the depth of each drill hole being 35 mm and the distance between the drill hole centres 18 mm), is, after insertion of the thermometer or thermocouple into the designated drill hole, preheated to a temperature just below the ignition temperature using a blowtorch. This temperature is determined by means of a preliminary test. A spatula-tipful (10 g) of the metal powder or hydride to be analysed is then introduced into the material drill hole in the preheated ignition block and the block is heated with the maximum blowtorch flame until the powder self-ignites. The temperature reached is the ignition temperature.

It is also desirable for the metal alloy powders to have a content of at least 75 wt. % metal or metal hydride, preferably at least 88 wt. %, particularly preferably at least 90 wt. %, an average particle diameter of 1 to 15 μm, a preferred particle size distribution d50 (measured by laser diffraction) of 1 to 20 μm and a BET specific surface area of 0.2 to 5 $m^2/g$.

The average particle diameter is determined using a Fisher Sub-Sieve Sizer (hereinafter referred to as FSSS). A description of this method of measurement can be found in "Instructions, Fisher Model 95 Sub-Sieve Sizer, Catalogue No. 14-311, Part No. 14579 (Rev. C), published 01-94" from Fisher Scientific. Reference is expressly made here to this measurement description.

The object is further achieved by a process for producing alloy powders based on titanium, zirconium and hafnium, alloyed with the elements Ni, Cu, Ta, W, Re, Os and Ir, wherein an oxide of the base elements is mixed with a reducing agent and the metal to be alloyed and this mixture is heated in an oven under an argon atmosphere, optionally under a hydrogen atmosphere (to form metal hydrides), until the reduction reaction begins, the reaction product is leached and then washed and dried, the oxide used having an average particle size of 0.5 to 20 µm, preferably 1 to 6 µm, a BET specific surface area of 0.5 to 20 m²/g, preferably 1 to 12 m²/g and particularly preferably 1 to 8 m²/g, and a minimum content of 94 wt. %, preferably 96 wt. % and particularly preferably 99 wt. %.

The proportion of Fe and Al impurities in the oxide is preferably <0.2 wt. % each, particularly preferably <0.08 wt. % (calculated in each case as oxide). The proportion of Si impurities in the oxide is preferably <1.5 wt. %, particularly preferably <0.1 wt. % (calculated as $SiO_2$). The proportion of Na impurities in the oxide is preferably <0.05 wt. % (calculated as $Na_2O$). The proportion of P impurities in the oxide is preferably <0.2 wt. % (calculated as $P_2O_5$). The ignition loss of the oxide at 1000° C. (constant weight) is preferably <1 wt. %, particularly preferably <0.5 wt. %. The tamped density as defined in EN ISO 787-11 (formerly DIN 53194) of the oxide is preferably 800 to 1600 kg/m³. The oxide can be replaced in a proportion of up to 15 wt. % by additions of MgO, CaO, $Y_2O_3$ or $CeO_2$.

Reaction of the mixture is preferably performed under helium and/or argon and/or hydrogen and/or nitrogen atmosphere.

In preferred embodiments the alloying elements have a particle size of 0.5 to 15 µm.

It is also preferred that the alloying elements have a minimum content of 99.5 wt. %.

It is furthermore preferred that the proportion of Fe and Al impurities in the oxide is <0.1 wt. % each (calculated as oxide).

It is also preferred that the proportion of Si impurities in the oxide is <1.5 wt. % (calculated as $SiO_2$).

It was found that with the targeted selection of oxidic raw materials having the properties described and subsequent performance of the process, products are obtained which have a burning time of 10 s/50 cm to 3000 s/50 cm, an ignition energy of 1 µJ to 10 mJ, an average particle size of 1 to 8 µm, a BET specific surface area of 0.2 to 5 m²/g and an ignition temperature of 160° C. to 400° C. or more in individual cases, reproducible particle size distributions being obtained in each case. The combination of average particle size and specific surface area in the specified ranges in the oxidic starting compound together with the specified minimum content leads to the desired product.

The following can preferably be used as reducing agents: alkaline-earth metals and alkali metals and the hydrides thereof. Magnesium, calcium, calcium hydride and barium or defined mixtures thereof are particularly preferred. The reducing agent preferably has a minimum content of 99 wt. %, particularly preferably 99.5 wt. %.

Depending on the proportion of alloying agent, powdered pure metal alloy powders, in some cases hydrogenated metal alloy powders or metal hydride alloy powders are obtained. The higher the hydrogen content and the higher the proportion of the alloying element in the process product, the longer the burning time, i.e. the metal alloy powder burns more slowly, and the higher the ignition temperature (the metal alloy powder ignites at higher temperatures), and vice versa.

Leaching of the reaction product is preferably performed with concentrated hydrochloric acid, which is particularly preferably used in a slight excess.

DESCRIPTION OF PREFERRED EMBODIMENTS

The invention is described in greater detail below by means of examples:

Example 1

Production of a Zirconium/Tungsten Alloy Powder, Target Composition 50/50 (Zr/W)

21.6 kg of $ZrO_2$ (powdered zirconium oxide, natural baddeleyite) having the following properties: $ZrO_2+HfO_2$ min. 99.0%, $HfO_2$ 1.0 to 2.0%, $SiO_2$ max. 0.5%, $TiO_2$ max. 0.3%, $Fe_2O_3$ max. 0.1%, ignition loss max. 0.5%, average particle size (FSSS) 4 to 6 µm, proportion of monoclinic crystal structure min. 96%, specific surface area (BET) 0.5 to 1.5 m²/g and 160.0 kg of tungsten metal powder having the following properties: W min. 99.95% (without oxygen), oxygen max. 0.5%, Al max. 10 ppm, Cr max. 80 ppm, Cu max. 5 ppm, Fe max. 100 ppm, Mo max. 100 ppm, Na max. 20 ppm, Ni max. 100 ppm, Si max. 30 ppm, average particle size (FSSS) 0.7 µm+/−0.1 µm, tapped density 0.150 to 0.220 dm³/kg, bulk density 0.570 to 0.740 g/l and 31.5 kg of calcium in granular form having the following properties: Ca min. 99.3%, Mg max. 0.7%, were mixed together in a mixing vessel for 20 minutes under an argon atmosphere. The mixture was then introduced into a container. The container was placed in an oven, which was then sealed and filled with argon to an excess pressure of 100 hPa. The reaction oven was heated to a temperature of approx. 1250° C. over one hour. As soon as the reaction mass reached the temperature of the oven, the reduction reaction began:

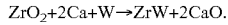
$$ZrO_2+2Ca+W \rightarrow ZrW+2CaO.$$

Sixty minutes after the oven heating was switched on, it was switched off again. Once the temperature had fallen to below 50° C. the reaction mass was removed from the crucible and leached with concentrated hydrochloric acid. A zirconium/tungsten metal powder alloy with the following analysis was obtained: 96.1% Zr+Hf+W, 2.2% Hf, 0.7% O, 0.06% H, 0.38% Mg, 0.076% Fe, 0.25% Al, 1.2 µm average particle size, particle size distribution d50: 2.8 µm, specific surface area: 0.5 m²/g, ignition temperature: 220° C., burning time: 55 s/50 cm.

Example 2

Production of Zirconium/Tungsten Alloy Powder, Target Composition 50/50 (Zr/W)

16.2 kg of $ZrO_2$ (powdered zirconium oxide) having the following properties: $ZrO_2+HfO_2$ min. 99.0%, $HfO_2$ 1.0 to 2.0%, $SiO_2$ max. 0.2%, $TiO_2$ max. 0.25%, $Fe_2O_3$ max. 0.02%, ignition loss max. 0.4%, average particle size (FSSS) 3 to 5 µm, proportion of monoclinic crystal structure min. 96%, specific surface area (BET) 3.0 to 4.0 m²/g and 12.0 kg of tungsten metal powder having the following properties: W min. 99.95% (without oxygen), oxygen max. 0.5%, Al max. 10 ppm, Cr max. 80 ppm, Cu max. 5 ppm, Fe max. 100 ppm, Mo max. 100 ppm, Na max. 20 ppm, Ni max. 100 ppm, Si max. 30 ppm, average particle size (FSSS) 0.7+/−0.1 µm, tapped density 0.150 to 0.220 dm³/kg, bulk density 0.570 to 0.740 g/l and 7.2 kg of Mg (magnesium chips) having the following properties: Mg min. 99.5%, bulk density max. 0.3 to 0.4 g/cm³ were placed in a container in an oven in an analogous manner to Example 1. The oven was heated to 1050° C. As soon as the reaction mass reached the temperature of the oven, the reduction reaction began:

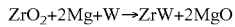
$$ZrO_2+2Mg+W \rightarrow ZrW+2MgO$$

The oven heating was switched off 20 minutes after the start of the reduction. Once the temperature had fallen to below 50° C. the reaction mass was removed from the crucible and leached with concentrated hydrochloric acid. A zirconium/tungsten metal powder alloy with the following analysis was obtained: 97.9% Zr+Hf+W, 53% Zr, 0.9% Hf, 44% W, 0.083% Fe, 0.075% Al, 0.19% Mg, 0.087% Si, 0.04% H, average particle size 1.2 μm, particle size distribution d50: 2.6 μm, ignition temperature: 200° C., burning time: 44 s/50 cm.

Example 3

Production of Zirconium/Tungsten Alloy Powder, Target Composition 40/60 (Zr/W)

13.0 kg of ZrO$_2$ (powdered zirconium oxide) having the following properties: ZrO$_2$+HfO$_2$ min. 99.0%, HfO$_2$ 1.0 to 2.0%, SiO$_2$ max. 0.2%, TiO$_2$ max. 0.25%, Fe$_2$O$_3$ max. 0.02%, ignition loss max. 0.4%, average particle size (FSSS) 3 to 5 μm, proportion of monoclinic crystal structure min. 96%, specific surface area (BET) 3.0 to 4.0 m$^2$/g and 14.4 kg of tungsten metal powder having the following properties: W min. 99.95% (without oxygen), oxygen max. 0.5%, Al max. 10 ppm, Cr max. 80 ppm, Cu max. 5 ppm, Fe max. 100 ppm, Mo max. 100 ppm, Na max. 20 ppm, Ni max. 100 ppm, Si max. 30 ppm, average particle size (FSSS) 0.7+/−0.1 μm, tapped density 0.150 to 0.220 dm$^3$/kg, bulk density 0.570 to 0.740 g/l and 5.8 kg of Mg (magnesium chips) having the following properties: Mg min. 99.5%, bulk density max. 0.3 to 0.4 g/cm$^3$ were placed in a container in an oven in an analogous manner to Example 1. The oven was heated to 1050° C. As soon as the reaction mass reached the temperature of the oven, the reduction reaction began:

$$ZrO_2 + 2Mg + W \rightarrow ZrW + 2MgO$$

The oven heating was switched off 20 minutes after the start of the reduction. Once the temperature had fallen to below 50° C. the reaction mass was removed from the crucible and leached with concentrated hydrochloric acid. A zirconium/tungsten metal powder alloy with the following analysis was obtained: 97.8% Zr+Hf+W, 41% Zr, 0.78% Hf, 56% W, 0.028% Fe, 0.090% Al, 0.14% Mg, 0.097% Si, 0.14% H, 1.2 μm average particle size, particle size distribution d50: 2.2 μm, ignition temperature: 200° C., burning time: 37 s/50 cm.

Example 4

Production of Zirconium/Nickel Alloy Powder, Target Composition 70/30 (Zr/Ni)

36 kg of ZrO$_2$ (powdered zirconium oxide) having the following properties: ZrO$_2$+HfO$_2$ min. 98.5%, HfO$_2$ 1.0 to 2.0%, SiO$_2$ max. 0.6%, TiO$_2$ max. 0.15%, Fe$_2$O$_3$ max. 0.05%, Na$_2$ to max. 0.3%, ignition loss max. 0.5%, average particle size (FSSS) 1.7 to 2.3 μm and 26.4 kg of Ca (calcium chips) having the following properties: Ca min. 98.5%, Mg max. 0.5% and 2.0 kg of Mg (magnesium chips) having the following properties: Mg min. 99.5%, bulk density max. 0.3 to 0.4 g/cm$^3$ were mixed together in a mixing vessel for 20 minutes under an argon atmosphere. The mixture was then introduced into a container. The container was placed in an oven, which was then sealed and filled with argon to an excess pressure of 100 hPa. The reaction oven was heated to a temperature of approx. 1250° C. over one hour. As soon as the reaction mass reached the temperature of the oven, the reduction reaction began:

$$ZrO_2 + 2Ca/Mg \rightarrow Zr + 2CaO/MgO$$

Sixty minutes after the oven heating was switched on, it was switched off again. Once the temperature had fallen to below 50° C. the reaction mass was removed from the crucible and mixed with 13 kg of Ni (powder) having the following properties: C max. 0.1%, Fe max. 0.01%, 0 max. 0.15%, S max. 0.002%, average particle size (FSSS) 4 to 6 μm, in a mixer for 30 minutes.

The mixture was then introduced into a container. The container was placed in an oven, which was then sealed and filled with argon to an excess pressure of 100 hPa. The reaction oven was heated to temperatures of 500° C. to 1000° C. After completion of the alloying reaction:

$$Zr + 2CaO/MgO + Ni \rightarrow ZrNi + 2CaO/MgO$$

the reaction mass was removed from the crucible and leached with concentrated hydrochloric acid. A zirconium/nickel alloy powder with the following analysis was obtained: 98.3% Zr+Ni (including Hf), Zr 70.2%, Ni 28.1%, Hf 1.4%, Ca 0.09%, Fe 0.046%, Al 0.13%, S 0.003%, burning time: 210 s/50 cm, ignition temperature: 40° C., average particle size (FSSS): 4.2 μm.

Example 5

Production of Titanium/Copper Alloy Powder, Target Composition 75/25 (Ti/Cu)

31.2 kg of TiH$_2$ (powdered titanium hydride) having the following properties: TiH$_2$ min. 98.8%, H min. 3.8%, N max. 0.3%, Mg max. 0.04%, Fe max. 0.09%, Cl max. 0.06%, Ni max. 0.05%, Si max. 0.15%, C max. 0.03%, average particle size (FSSS) 3 to 6 μm and 10.0 kg of Cu (copper in powder form) having the following properties: Cu min. 99.3%, bulk density 2.6 to 2.8 kg/dm$^3$, screen analysis 325 mesh 50 to 65 μm, screen analysis 150 mesh 10 to 20 μm were mixed together in a mixing vessel for 20 minutes under an argon atmosphere. Then the mixture was placed on metal sheets in 5 kg batches. The metal sheets were placed in an oven, which was then sealed and filled with argon to an excess pressure of 100 hPa. The oven was then evacuated. The reaction oven was heated under vacuum in several stages over 6 hours to a maximum temperature of approx. 800° C. The reaction proceeds as follows:

$$TiH_2 + Cu \rightarrow TiCu + H_2$$

After approximately 4 h (depending on the pressure in the oven) the oven heating was switched off. Once the oven had cooled to room temperature the mass was removed and the agglomerates broken up. A TiCu alloy with the following analysis was obtained: 72.4% Ti, 25.3% Cu, 1.4% O, 0.02% H, 0.05% Al, 0.02% Fe, 0.005% Mg, Cd<0.001%, Zn<0.002%, Hg<0.0002%, particle size distribution d50: 17.7%, average particle size (FSSS): 9.4 μm.

It is claimed:
1. A method for producing an alloy powder comprising the steps of:
 mixing at least one oxide selected from the group consisting of titanium oxide, zirconium oxide and hafnium oxide with at least one element selected from the group consisting of Ni, Cu, Ta, W, Re, Os and Ir, and a reducing agent to form a mixture;

heating the mixture in an oven in an argon atmosphere until a reduction reaction begins and a reaction product is obtained; and leaching, washing and drying the reaction product to yield the alloy powder;

wherein the at least one oxide has a mean particle diameter (FSSS) of 0.5 to 20 μm, a BET specific surface area of 0.5 to 20 m²/g and a minimum metal oxide content of 94 wt. %; and wherein the alloy powder has a burning time of 10 s/50 cm to 3000 s/50 cm, an ignition energy of 1 μJ to 10 mJ, an average particle size of from 1 to 8 μm, a BET specific surface area of 0.2 to 5 m²/g and an ignition temperature of 160° C. to 400° C.

2. A method as claimed in claim 1, wherein the minimum metal oxide content is 99.5 wt. %.

3. A method as claimed in claim 1, wherein the fraction of Si, Fe and Al impurities in the element is <0.1 wt. %.

4. A method as claimed in claim 1, wherein the mixture in the oven is heated to 800 to 1400° C.

5. A method as claimed in claim 2 wherein the mixture in the oven is heated to 800 to 1400° C.

6. A method as claimed in claim 1, wherein the fraction of Fe and Al impurities in the oxide is each <0.2 wt. %, calculated as the oxide.

7. A method as claimed in claim 6, wherein the fraction of Fe and Al impurities in the oxide are each <0.1 wt. %, calculated as the oxide.

8. A method as claimed in claim 1, wherein the fraction of Si impurities in the oxide is <1.5 wt. %, calculated as $SiO_2$.

9. A method as claimed in claim 8, wherein the fraction of $SiO_2$ impurities in the oxide is <0.3 wt. %, calculated as $SiO_2$.

10. A method as claimed in claim 1, wherein the fraction of Na impurities in the oxide is <0.05 wt. %, calculated as $Na_2O$, and the fraction of P impurities in the oxide is <0.2 wt. %, calculated as $P_2O_5$.

11. A method as claimed in claim 1, wherein the oxide used has an average particle size of 1 to 6 μm.

12. A method as claimed in claim 1, wherein the oxide has a BET specific surface area of 1 to 12 m²/g.

13. A method as claimed in claim 1, wherein the oxide has a BET specific surface area of 1 to 8 m²/g.

14. A method as claimed in claim 1, wherein the oxide used has a minimum content of 96 wt. %.

15. A method as claimed in claim 1, wherein the oxide has a minimum content of 99 wt. %.

16. A method as claimed in claim 1, wherein the proportion of Na impurities in the oxide is<0.05 wt. % calculated as $Na_2O$.

17. A method as claimed in claim 1, wherein the proportion of P impurities in the oxide is <0.2 wt. % calculated as $P_2O_5$.

18. A method as claimed in claim 1, wherein the ignition loss of the oxide at 1000° C. at constant weight is <1 wt. %.

19. A method as claimed in claim 1, wherein the tamped density as defined in EN ISO 787-11 of the oxide is 800 to 1600 kg/m³.

20. A method as claimed in claim 1, wherein the reducing agent is selected from the group consisting of an alkaline-earth metal, an alkali metal, an alkaline-earth hydride and an alkali metal hydride.

21. A method as claimed in claim 1, wherein the reducing agent is selected from the group consisting of Mg, Ca, $CaH_2$ and Ba.

22. A method as claimed in claim 1, wherein the reducing agent has a minimum content of reducing agent of 99 wt. %.

23. A method as claimed in claim 1, wherein leaching of the reaction product is performed with hydrochloric acid.

24. A method as claimed in claim 1, wherein the element is nickel.

25. A method as claimed in claim 24 wherein the argon atmosphere when heating the mixture of the reaction product with nickel powder is at a pressure of at least 100 hPa and wherein the mixture of the reaction product with nickel powder is heated at a temperature of between 500° C. to 1000° C.

26. A method for producing an alloy powder based on zirconium, alloyed with the element Ni, comprising mixing 36 kg of $ZrO_2$ having the following properties: $ZrO_2$ and $HfO_2$ minimum content of 98.5%, an $HfO_2$ content of from 1.0 to 2.0%, a $SiO_2$ maximum of 0.6%, a $TiO_2$ maximum content of 0.15%, an $Fe_2O_3$ maximum content of 0.05%, an ignition loss maximum 0.5%, an average particle size (FSSS) 1.7 to 2.3 μm, together with 26.4 kg of calcium in the form of chips having the following properties: a Ca minimum content of 98.5%, a maximum Mg content of 0.5%, and 2.0 kg of magnesium in the form of chips having the following properties: a minimum Mg content of 99.5%, a bulk density maximum of 0.3 to 0.4 g/cm³ in a mixing vessel for 20 minutes under an argon atmosphere;

introducing this mixture into a container, then sealing and filling the container with argon to an excess pressure of 100 hPa;

heating the mixture in an oven to a temperature of 1250° C. over one hour, wherein sixty minutes after the oven heating is switched on it is switched off again and, once the temperature has fallen to below 50° C. to react the mixture and form a reaction mass:

removing the resultant reaction mass is removed from the container; mixing the reaction mass with 13 kg of Ni powder having the following properties: a maximum C content of 0.1%, a maximum Fe content of 0.01%, a maximum O content of 0.15%, a maximum S content of 0.002%, an average particle size (FSSS) 4 to 6 μm, in a mixer for 30 minutes:

introducing the mixture into a container;

placing the container in an oven: sealing and filling the oven with argon to an excess pressure of 100 hPa;

heating the oven to temperatures of 500° C. to 1000° C. to form an alloy mixture, and thereafter removing the alloy mixture crucible:

leaching the removed alloy mixture with concentrated hydrochloric acid to form a leached mixture;

and then washing and drying the leached mixture to form the alloy powder; wherein the alloy powder has the following content analysis: 98.3% Zr and Ni, Zr 70.2%, Ni 28.1%, Hf 1.4%, Ca 0.09%, Fe 0.046%, Al 0.13%, S 0.003%, a burning time of 210 s/50 cm, an ignition temperature of 240° C., and an average particle size by FSSS of 4.21 μm.

27. A method for producing an alloy powder comprising the steps of:

mixing at least one oxide selected from the group consisting of titanium oxide, zirconium oxide with a reducing agent and heating the mixture in an oven having an argon atmosphere until a reduction reaction begins to obtain a reaction product;

cooling the reaction product;

mixing the cooled reaction product with an alloying metal selected from the group consisting of Ni, Cu, Ta, W, Re, Os and Ir to form an alloying mixture and heating the alloying mixture to form the alloy powder;

wherein the at least one oxide has a mean particle diameter (FSSS) of 0.5 to 20 μm, a BET specific surface area of 0.5 to 20 m²/g and a minimum metal content of 94 wt. %; and wherein the alloy powder has a burning time of 10 s/50 cm to 3000 s/50 cm, an ignition energy of 1 µJ to 10 mJ, an average particle size of from 1 to 8 µm, a BET specific surface area of 0.2 to 5 m²/g and an ignition temperature of 160° C. to 400° C.

* * * * *